United States Patent [19]
Crawford et al.

[11] Patent Number: 5,966,674
[45] Date of Patent: Oct. 12, 1999

[54] FLOW SIGNAL FILTER

[75] Inventors: Charles Crawford, Wall; Vincent Ferri, Pittsburgh; Robert D. Dimsa, Elizabeth; Gary Bailey, Baden, all of Pa.

[73] Assignee: Westinghouse Air Brake Company, Wilmerding, Pa.

[21] Appl. No.: 08/826,897

[22] Filed: Apr. 9, 1997

[51] Int. Cl.[6] .................................................. B60T 13/66
[52] U.S. Cl. ................................ 702/47; 702/45; 702/50; 702/114; 702/138; 364/528.1; 364/528.17; 364/528.36; 303/3; 303/15; 303/33; 701/70
[58] Field of Search .................................. 702/45–47, 50, 702/51, 85, 98, 100, 104, 105, 113, 114, 116, 138, 189–191, 197; 364/582.1, 528.16, 528.17, 528.36, 724.011, 724.013; 303/3, 15, 33; 73/861.42, 861.48, 861.49, 861.52, 861.61, 1.25, 1.34; 701/70, 71, 75–78, 81, 83; 377/19–21; 137/1, 624.11, 624.12, 624.15

[56] References Cited

U.S. PATENT DOCUMENTS

| | | | |
|---|---|---|---|
| 3,957,314 | 5/1976 | Falke | 303/3 |
| 5,286,096 | 2/1994 | Ferri et al. | 303/15 |
| 5,796,637 | 8/1998 | Glew et al. | 702/190 |

*Primary Examiner*—Hal Dodge Wachsman
*Attorney, Agent, or Firm*—James Ray & Associates

[57] ABSTRACT

Method and apparatus for providing a filtered signal which indicates of a flow of fluid to a fluid pressure communication conduit, the flow being dependent upon the pressure of fluid in a chamber. The pressure in the chamber is controlled by one or more pressure adjusting valves. The invention provides for receiving into a data processing module one or more valve signals indicating open states of the pressure adjusting valve or valves, and also a flowrate signal from a flowrate sensor, which represents the real instantaneous flowrate, and it is this signal which needs to be filtered to remove transients. The invention provides for choosing between a first processing mode and a second processing mode for the flowrate signal. The first processing mode is used when the second processing mode is not in effect, and when neither of the valve signals indicates an open valve. The second processing mode is activated a valve signal indicates an open valve. The second processing mode, when activated, proceeds according to a predetermined procedure and then returns to the first processing mode after no valve signal indicates an open valve. The signal is processed by either the first processing mode or the second processing mode, depending on whether valve signals have been received, and provides the filtered signal as an output to equipment external to the data processing module.

27 Claims, 4 Drawing Sheets

FLOW SIGNAL FILTER

CROSS-REFERENCE TO RELATED APPLICATIONS

The invention taught in this patent application is closely related to the following U.S. Pat. No. 5,563,353. This patent is entitled Software Nullification of Transducer Induced Offset Errors Within a Flow Rate Measurement System. It is also related to the following U.S. Pat. No. 5,621,657, entitled. Automatic detection of Air Flow Transducer Type Under Software Control. The present application is also related to the following co-pending patent application: Modified Airflow Algorithm with Compensation for Variations in Main Reservoir Air Pressure and Ambient Airflow. This co-pending application is being filed on the same date as the present application and has Ser. No. 08/831,576. Further, the teachings of the above mentioned patents and application are incorporated herein by reference thereto. The patents and application cited above have been assigned to the assignee of the present invention.

FIELD OF THE INVENTION

The present invention relates, in general, to airflow measurements and, more particularly, the instant invention relates to measurement of airflow from a main reservoir of a locomotive to the brake line of the locomotive.

BACKGROUND OF THE INVENTION

As is generally well known in the railway engineering arts, brakes on a train are generally controlled by a brake line which carries compressed air from the locomotive of the train to braking systems in the individual railroad vehicles of the train. It is also well known that the classical airbrake system as derived from the Westinghouse airbrake maintains compressed air in the brake line when brakes are not required, and signals a need for brake application by dumping air from the brake pipe in the locomotive to decrease the pressure in the brake air line when a brake application is called for. This system has the desirable feature that a failure of the brake air line causes application of brakes throughout the train.

Unfortunately, the time needed for a pressure decrement to propagate down the line of railroad vehicles in a train can be quite large, a minute or more for a mile-long freight train. Hence, brakes on cars remote from the engine do not help in is stopping the train until some time has elapsed following the brake application.

More rapid methods are known for transmitting a signal for brake application down the length of a train, which, for example, include the use of electrical wires, electromagnetic signals, or optical transmission. For railroad braking systems, the classical brake air line may be combined with radio transmission, particularly in a train having locomotives distributed at various locations along the train.

The WABCO EPIC® brake system combined with a radio communication link from Harris LOCOTROL® provides a system in which a brake application signaled by the lead locomotive of a train is accompanied by a radio signal sent from the lead locomotive to slave locomotives in portions of the train remote from the lead locomotive. As usual, with railroad airbrake systems, the lead locomotive dumps brakeline air, which sends a pressure decrement down the line of cars, causing a brake application as it proceeds. In addition, the radio signal is immediately received in locomotives remote from the lead locomotive, and these also begin venting brakeline air. Brakeline pressure decrements then begin to travel along the succession of railroad vehicles from each slave locomotive, causing the brakes to be applied as the pressure decrement reaches each vehicle.

Operation of this system requires, in each locomotive which supplies air to the brakeline, a measurement of the flowrate of air from a main air reservoir in the locomotive to the brakeline of the locomotive. The air pressure in the main air reservoir is maintained by a compressor in the locomotive. This flowrate can be used for a number of purposes. One thing it is used for is to determine the leakage flowrate. This is the flowrate of air which leaks out of the brakeline anywhere in the train. An accurate value for this flowrate is also desirable when the train is being prepared for travel, or after a brake application. In both of these cases, the brakeline pressure must be brought up to the operating pressure value. By measuring the flowrate to the brakeline, the system can determine when the bakeline is charged. This occurs when the measured flow through the orifice is approximately equal to the leakage flowrate. A signal indicating the flowrate is also sent to an alarm system, which interprets a sudden increase in flowrate as indicating a failure of the brake air line. This causes brake application, and a signal to the lead locomotive to stop the train.

The flowrate of air is measured by an orifice, such as the air path constriction in the L19 flowblock, which is located between the main air reservoir, and the brakeline.

Another difficulty with the prior art systems is due to the following considerations: One is that during steady state, when the brakes are not being applied, the brakeline continuously leaks air, and demands air from the main reservoir. Hence, the main reservoir loses pressure continuously through the orifice supplying the brakeline, and is resupplied with air by pulses of air originating in the compressor. A brake control valve placed downstream of the orifice, and upstream of the brakepipe, controls the pressure downstream of the valve in the brakepipe. The brake control valve controls airflow by a mechanical linkage to a diaphragm in an equalizing chamber. On one side of the diaphragm, in the equalizing chamber space, pressure is maintained at a constant value by pulses of air from the main chamber, and pulses of air discharged from the reservoir to the atmosphere by means of electric magnet valves. The other side of the diaphragm in the equalizing chamber has the pressure of the brakepipe. Motions of the diaphragm cause changes in the opening provided through the main control valve, to maintain the pressure in the brakepipe at a predetermined value. An unfortunate aspect of this system is that since the pressure in the equalizing space is increased or decreased in pulses, the diaphragm between the equalizing space and the space connected a pressure port on the brakepipe is moved in pulses. This directly causes pulsed variations of flow through the main control valve, and hence through the orifice which is used to measure the flow through the main control valve to the brakepipe. The signal indicating brakepipe flow, therefore, has pulsed variations due to the pulses of air admitted to or exhausted from the equalizing space.

Furthermore, the brakepipe generally has longitudinal waves caused, for example, by changes in acceleration of the train. When these waves encounter the main control valve, they change the pressure of air in the space next to the diaphragm on the side of the diaphragm toward the brakepipe. This causes the diaphragm to move, which causes a pulsed change in the flow through the main brakevalve. This flow is directly read by the pressure transducer or transducers which measure the pressure drop across the orifice, which is immediately upstream of the main brake valve. Hence, a change of flow is indicated. This tends to set off alarms which are intended to signal the situation of a severe leak or break in the brake line.

These pulsed variations have a particularly undesirable effect when these signals are differentiated in time to detect changes in flow to the brakepipe, as is necessary for responding quickly to a failed brakepipe. The differentiated flow signal may cause false indications of a failed brakepipe situation.

SUMMARY OF THE INVENTION

In one aspect, the present invention provides a method for providing a filtered signal which indicates of a flow of fluid to a fluid pressure communication conduit, the flow being dependent upon the pressure of fluid in a chamber. The pressure in the chamber is controlled by one or more pressure adjusting valves. The method includes receiving into a data processing module one or more valve signals indicating open states of the pressure adjusting valve or valves, and also a flowrate signal from a flowrate sensor. This signal represents the real instantaneous flowrate, and it is this signal which needs to be filtered to remove transients.

The method involves choosing between a first processing mode and a second processing mode for the flowrate signal. The first processing mode is used during times when the second processing mode is not in effect, and when neither of the valve signals indicates an open valve. The second processing mode is activated when one or more of the valve signals indicates an open valve. The second processing mode, when activated, proceeds according to a predetermined procedure and then returns to the first processing mode after no valve signal indicates an open valve.

The data processing module processes the signal by either the first processing mode or the second processing mode, depending on whether valve signals have been received, and provides the filtered signal as an output to equipment external to the data processing module.

In a further aspect, the invention provides an apparatus for providing a filtered signal which indicates a flow of fluid to a fluid pressure communication conduit, the flow being dependent upon a pressure of fluid in a chamber, the pressure of fluid in the chamber being controlled by at least one pressure adjusting valve.

The apparatus has a data processing module connected to receive at least one valve signal indicating an open state for one or more pressure adjustment valves. It is also is connected to receive a flowrate signal from a flowmeter in the supply path to the fluid pressure communication conduit.

Means are provided in the data processing module for choosing between a first processing mode and a second processing mode for the flowrate signal. The first processing mode is used during times when the second processing mode is not in effect, and when neither of the valve signals indicates an open valve. The second processing mode is activated when one or more valve signals indicates an open valve. It proceeds, when activated, according to a predetermined procedure and then returns to the first processing mode after no valve signal indicates an open valve.

The data processing module has means to processes the signal by either the first processing mode or the second processing mode, and to provide a filtered output signal to equipment external to the data processing module.

In an additional aspect the present invention provides an apparatus for providing an output signal which indicates a filtered value of airflow to a brakepipe of a locomotive. A pneumatic valve in the flow path to the brakepipe maintains the air pressure in the brakepipe equal to the pressure in an equalizing chamber. The pressure in the equalizing chamber is controlled by an electrically operated charge valve and an electrically operated discharge valve. The apparatus includes a data processing module connected to receive a charge valve signal which indicates an open condition for the charge valve, and it is also connected to receive a discharge valve signal which indicates an open condition for the discharge valve. The data processing module is also connected to receive a flow rate signal from a flow sensor in the supply path to the brakepipe, the flow sensor being in series with the pneumatic valve.

The data processing module has means for choosing between a first processing mode and a second processing mode for the flowrate signal. The first processing mode is chosen during times when the second processing mode is not in effect and when neither the charge valve signal nor the discharge valve signal is present. The first processing mode determines the output signal directly from an instantaneous value of the flowrate signal. The first processing mode terminates and the second processing mode begins on receipt of either a charge valve signal or a discharge valve signal.

The data processing module also has means for implementing a second processing mode. This includes at least one time counter and means for starting it when the second processing mode is started.

The module also has means for determining a base flow value based on the instantaneous value of the flowrate signal when the second processing mode begins, and for setting the output signal equal to the base flow value during a first filtering interval which terminates at a first predetermined time, as indicated by one of the time counters.

The module has means for determining a required change in output signal from the base flow value to the instantaneous value of the flowrate signal which prevails at the first predetermined time. It has means for transitioning the output signal from the base flow value to the flowrate signal obtained at the first predetermined time during a second filtering interval terminating at a second predetermined time.

The module also has means for terminating the second filtering interval and returning to the first processing mode at the second predetermined time, and it has means for terminating the second filtering interval prior to the second predetermined time if the flowrate signal becomes closer to the base flow value than the output signal.

OBJECTS OF THE INVENTION

It is, therefore, one of the primary objects of the present invention to provide a signal indicating airflow to a brakeline from which transients have been removed which would otherwise trigger alarms intended to detect failure or major leaks in the brakeline.

It is an additional object of the present invention to activate a filtering procedure in the event of a firing of an electrically-activated valve which maintains pressure in the equalizing chamber which controls flow to the brakeline.

It is another object of the present invention to terminate filtering after a fixed filtering interval, so that real flows indicative of brakepipe air loss are not masked.

Yet another object of the present invention is to terminate filtering early if the real flow settles down to a stable value.

Still another object of the present invention is to provide for a case in which the equalizing chamber has two valves, one for increasing its pressure and one for decreasing its pressure, and in which one of these valves has opened, starting the filtering process, whereupon the other of these valves is opened.

An additional object of the present invention is to provide a set of signals in a computer which cause it to execute a subroutine for carrying out the functions of this invention.

It is yet another object of the present invention to provide a subroutine in a computer which is also used for other purposes, the subroutine of the present invention being called at periodic time intervals. In addition to the various objects and advantages of the present invention which have been generally described above, there will be various other objects and advantages of the invention that will become more readily apparent to those persons who are skilled in the relevant art from the following more detailed description of the invention, particularly, when such detailed description is taken in conjunction with the attached drawing figures and with the appended claims.

BRIEF DESCRIPTION OF THE PRESENTLY PREFERRED AND VARIOUS ALTERNATIVE EMBODIMENTS OF THE INVENTION

Figure 1A:
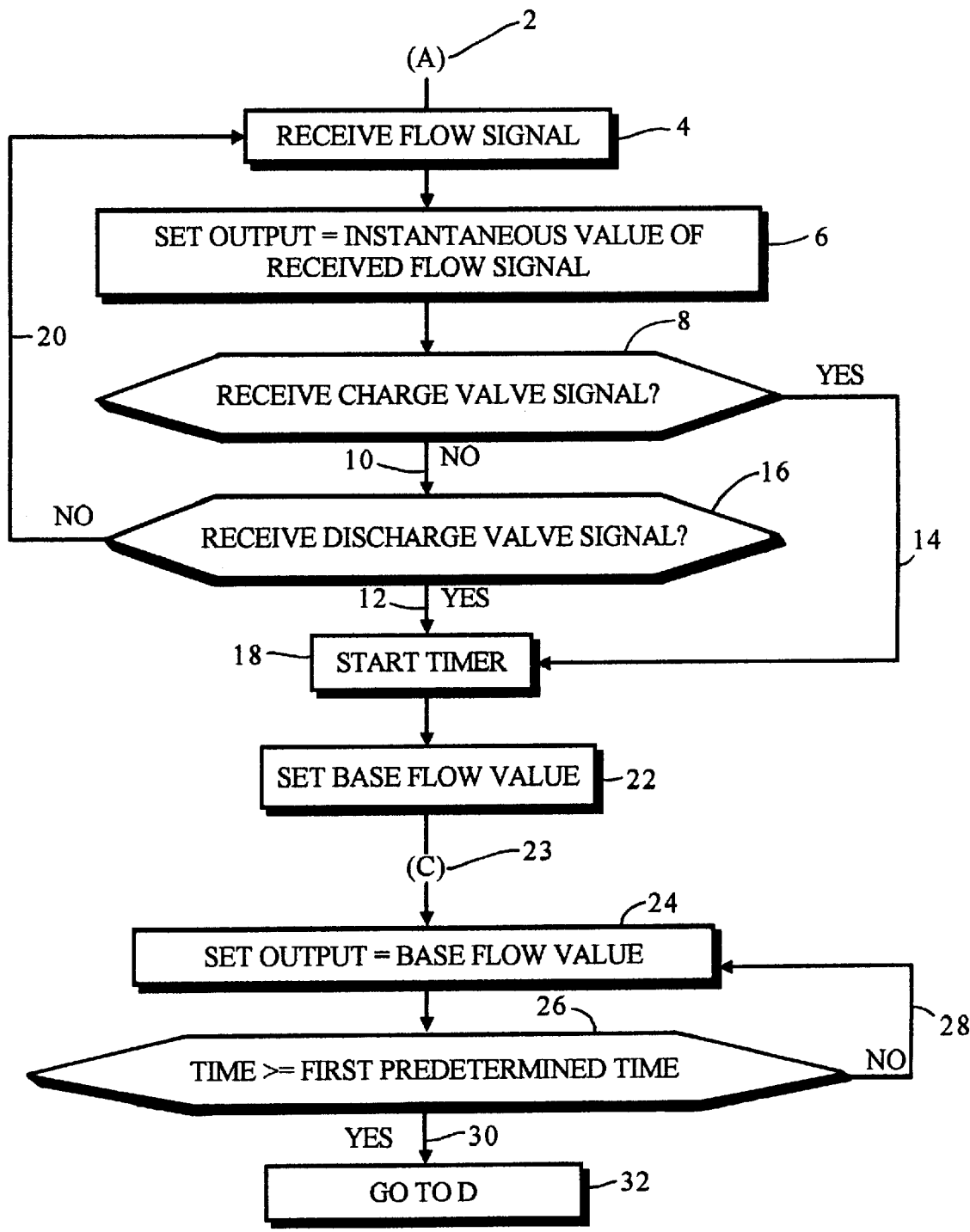
FIGS. 1A and 1B show a flowchart of one embodiment of the invention.
Figure 1B:
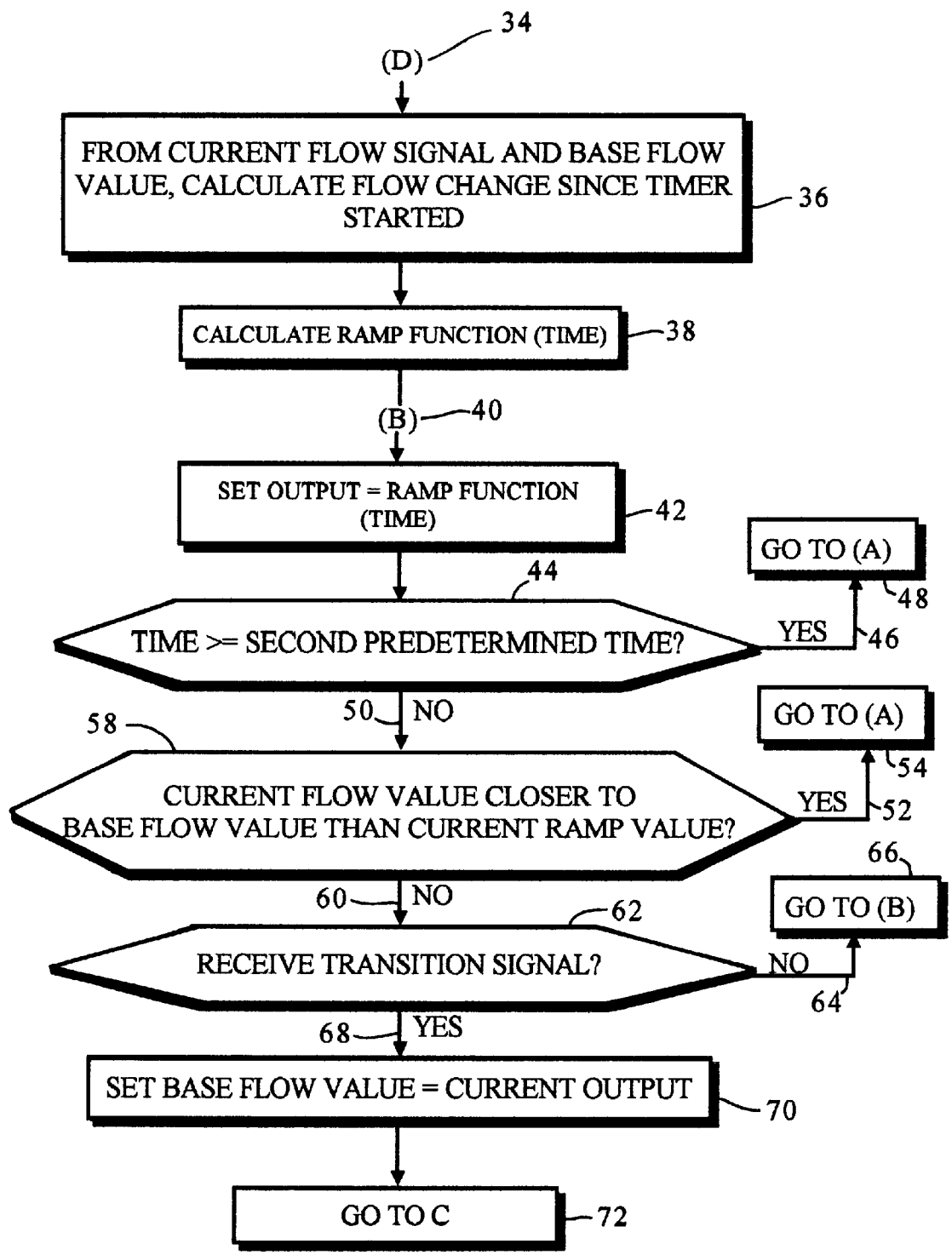

A flowchart of one embodiment of the present invention is shown in FIGS. 1A and 1B. This embodiment is for filtering the flowrate signal to the brakepipe of a locomotive. The processing begins at entry point 2 indicated as A in the flowchart. It proceeds to step 4 and receives a flow signal from a flowmeter (not shown) which provides an instantaneous value of the flow which is to be filtered. At 6, it sets the value of the output from the filter equal to the instantaneous value received at 4. At 8 it checks to see whether the charge valve has fired, in which case it follows path 14 to step 18. If not, it follows path 10 to 16 where a test is made to see whether the discharge valve has fired. If it has, processing proceeds by route 12 to 18. If the discharge valve has not fired, processing returns by path 20 to 4, and in step 6 the output continues to be set directly from the instantaneous value received at 4. At step 18, a timer is started and then the base flow value is set at 22. The base flow value is set equal to the instantaneous flow value which prevailed at the time that the timer was started. Processing proceeds to entry point C and thence to 24 where the output is set equal to the base flow value. Processing passes to 26 which tests to determine whether time indicated on the timer exceeds a first predetermined time. If it has not, processing returns by route 28 to step 24 and the process is repeated. If it has, it proceeds by path 30 to 32 which links to entry point D denoted 34 in FIG. 1B. From entry point D processing goes to 36 to calculate the flow change which occurred during the time interval up to the first predetermined time. A ramp function is then set in 38 which provides that change in flowrate during a time interval terminating at a second predetermined time. Processing continues past entry point B denoted 40 and thence to step 42 where the output value is set equal to an instantaneous value of the ramp function. A test is then made at 44 to determine whether the time indicated on the timer exceeds the second predetermined time. If it has, then processing follows path 46 to 48 and returns to entry point A denoted 2 in FIG. 1A. If it has not, it proceeds along path 50 to 58 where a test is made to see whether the real current value of the flow signal is closer to the base flow value than the current ramp value has relative to the base flow value. If it is, then processing follows path 52 to 54 and returns to entry point A denoted 2 in FIG. 1A. If it is not, processing follows route 60 to 62 where a test is made to determine whether a transition signal has been received. If a transition signal has not been received, processing follows path 64 to 66 and then returns to entry point B denoted 40. If a transition signal has been received, processing follows path 68 to 70 where the base flow value is set equal to the current output value, which is the current ramp value. It then proceeds to 72 and thence to C, where it uses the base flow value which was calculated in 70.

Figure 2:
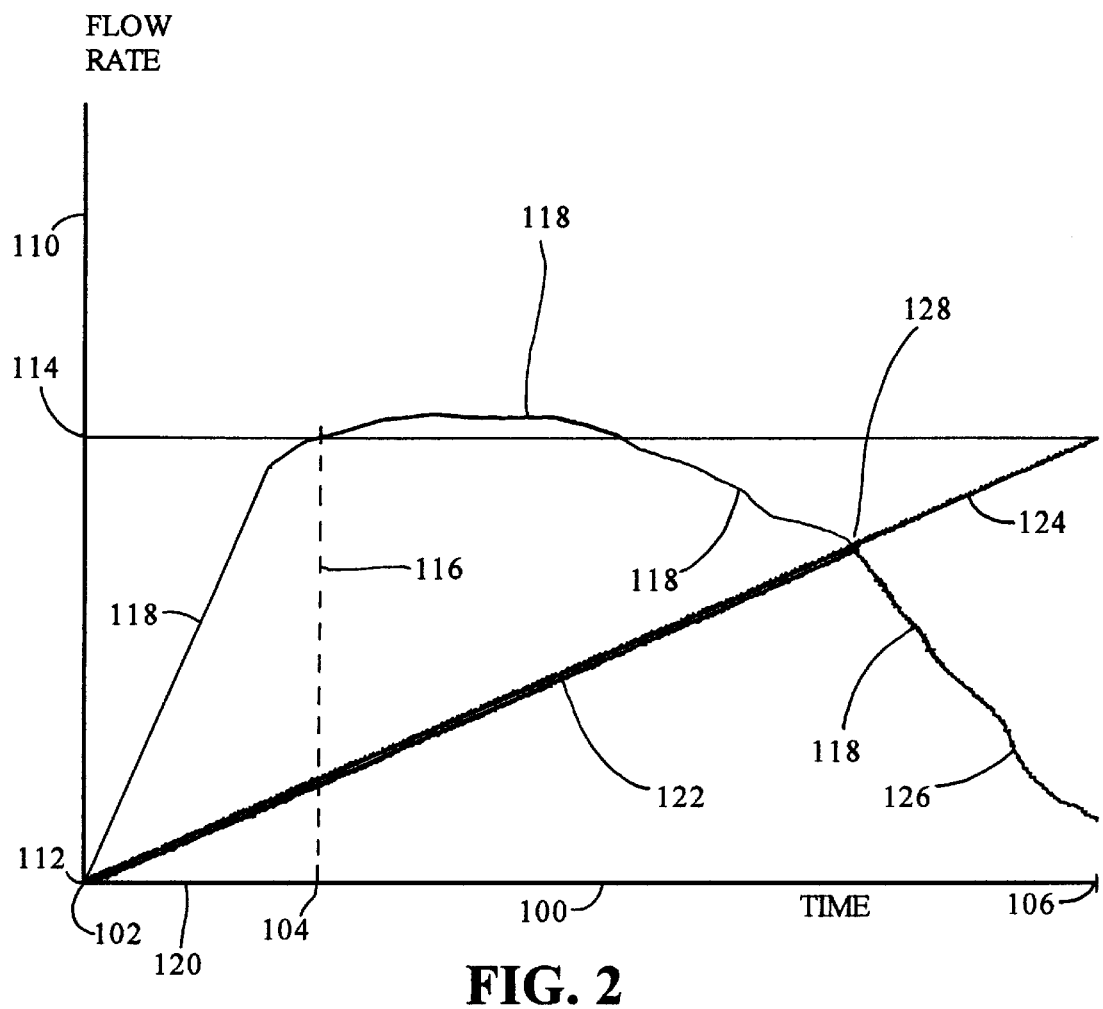
FIG. 2 shows a plot having time as the abscissa, which illustrates the filtering process of the invention.

FIG. 2 shows a time plot of the various values calculated by the invention. Time is the abscissa 100. The time denoted 102 is the time when a signal indicating an open valve is received. At this time a time counter is started. Time 104, in this particular embodiment is 600 milliseconds after time 102. Time 106 in this embodiment is 32 seconds after time 102. The abscissa 110 shows flowrate. The flowrate denoted 112 is the flowrate prevailing when the signal indicating an open valve was received. The curve 118, which begins at time 102 and terminates at time 106 shows a typical time history of the change in flowrate caused by the open valve condition. At the time denoted 104, projected upward by construction line 116, the anticipated peak value of flowrate 114 is determined. A ramp which includes segments 122 and 124 is then projected, the ramp terminating at the anticipated peak 114 at time 106.

Beginning at time 104, the output signal is set equal to the flow value of the ramp as it ascends toward peak value 114. If curve 118, the actual flow, drops below the ramp 124, as shown at crossover point 128, then the output 26 is set equal to the actual flow 118.

If, before reaching time 106, a signal is received indicating a transition from a signal indicating an opening of one of the two valves to a signal indicating an opening of the other valve, the system returns to a new starting time, 102, and the value of the output at that time is the value held during the time interval 120 before a new peak 114 is calculated and a new ramp 122 and 124 is determined, etc.

If neither of these events has occurred by the at time 106, the filtering action is stopped. This is expected to provide for the case in which the actual flow signal remains above value 114 due to a long duration flow disturbance which may be due to a serious cause, such as a large leak.

Figure 3:
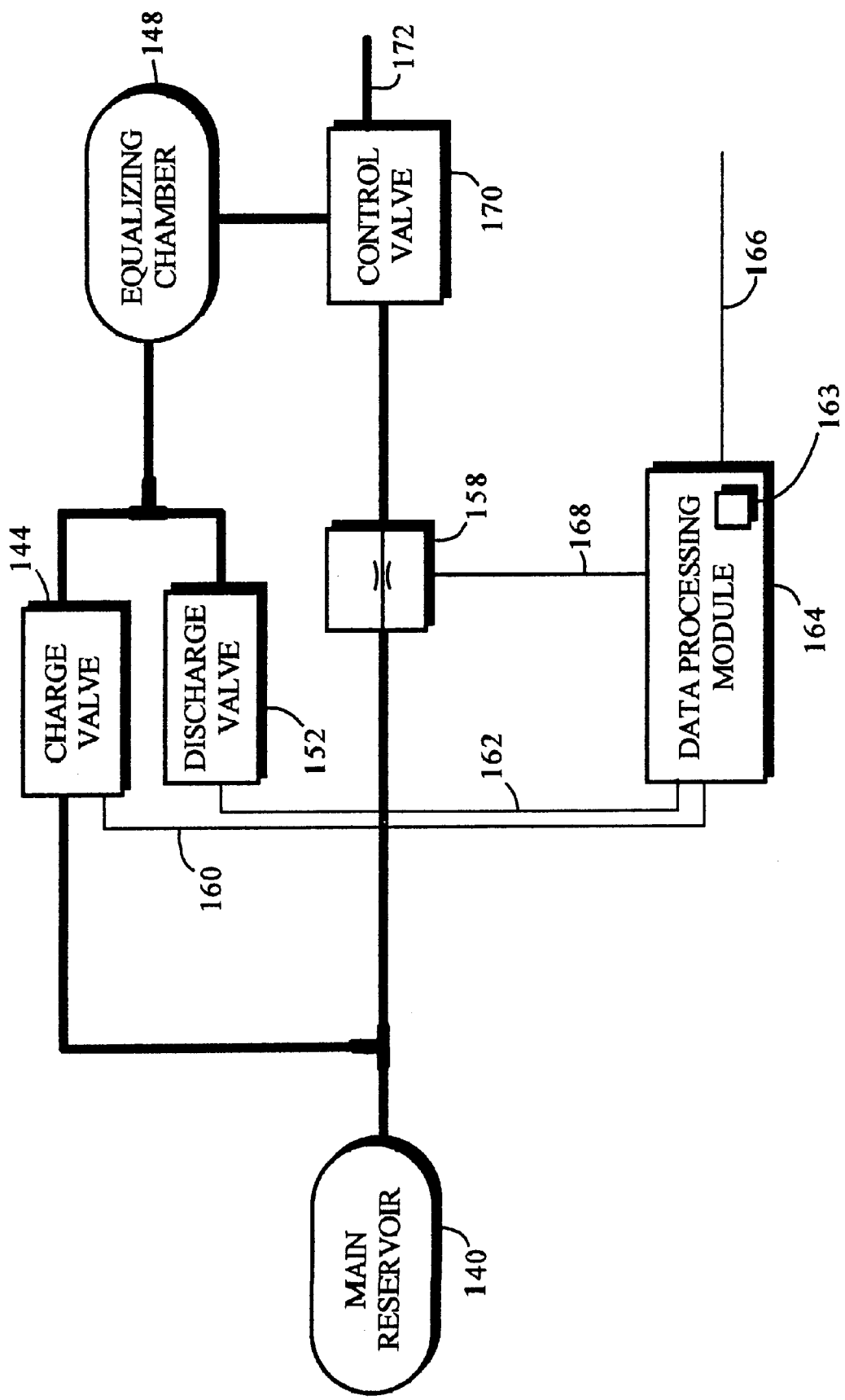
FIG. 3 is a schematic showing connections to the data processing module.

FIG. 3 is a schematic showing connections to the data processing module for the invention applied to a railway brakepipe. Main reservoir 140 supplies air through flowmeter 158 and control valve 170 to brakepipe 172. Control valve 170 is opened and closed by the pressure in equalizing chamber 148. Pressure in equalizing chamber 148 is maintained by at least one pressure adjusting valve, preferably charge valve 144 which is a pressure increasing valve and discharge valve 152, which is a pressure decreasing valve. These preferably are electric magnet valves. Charge valve 144 admits air from main reservoir 140 to equalizing chamber 148, and indicates an open state to data processing module 164 through charge signal line 160. Discharge valve 152 allows air from equalizing chamber 148 to be discharged to atmosphere, and indicates an open state to data processing module 164 through discharge signal line 162. Data processing module 164 includes time counter 163, and operates according to the flowcharts in FIG. 1A and FIG. 1B. Data processing module 164 provides filtered output signal 166, which is a filtered flowrate value.

A listing of the source code for a computer program for the presently most preferred embodiment of the invention is shown on the following pages. The program is written in the computer language known as C. The entire program is a function subroutine. which is to be called every 70 milliseconds. It is specifically written for the EpicR computer.

```
SOURCE CODE
# define DRAGON_TIME 458
# define DOWN-1
# define UP 1
BOOLEAN charge_flow_filter, discharge_flow_filter,
                flow_filter_trans;
int slay_dragon (int current_flow)
{
    static int time_counter=0;
    static int base_flow;
    static int old_flow;
    static int count,inc_time;
    static int time_out_counter;
    static int delta;
    static int slope;
    if (flow_filter_trans)
    {
       flow_filter_trans=FALSE;
       slope=NONE;
       current_flow=base_flow;
       time_counter=time_out_counter=0;
    }
if(charge_flow_filter|discharge_flow_filter)
{
        if (time_out_counter>=DRAGON_TIME)
        {
            charge_flow_filter=INACTIVE;
            discharge_flow_filter=INACTIVE;
            time_counter=time_out_counter=0;
            slope=NONE;
            return (current_flow);
        }
}
time_out_counter++;
if (time_counter==0)
{
        base_flow=current_flow;
        time_counter++;
}
else if (time_counter<9)
    {
        old_flow=current_flow;
        time_counter++;
    }
    else if (time_counter==9)
    {
        time_counter++;
*/      /*CALCULATE Slope VALUE
*/      /*DETLA =current_flow-base_flow
*/      /*DRAGON_TIME=32second/0.07seconds/sample=458 samples
*/      /*NUMBER OF SAMPLES TO GO BEFORE INCREMENT BY 1
*/      /*= DRAGON_TIME/DELTA
*/      /*ex. 458/60=7.63333 then add 1 to get 8.633 and typecast
*/      /*as a int to get 8
        delta=current_flow-base_flow;
        slope=UP;
        if (delta<0)
        {
            delta=base_flow-current_flow;
            slope=DOWN;
        }
        if (delta<4)
        {
            charge_flow_filter=INACTIVE;
            discharge_flow_filter=INACTIVE;
            time_counter=time_out_counter=0;
            slope=NONE;
            return (current_flow);
        }
```

-continued

```
        inc_time=(int) (DRAGON_TIME/delta)+1);
        count=inc_time;
        old_flow=current_flow;
    }
else
{
    if(count>=inc_time)
    {
       if(slope==UP)
         base_flow=(base_flow+1 - old_flow + current_flow);
             /*base_flow++;*/
       else if(slope==DOWN)
         base_flow=(base_flow - 1 - old_flow+current_flow);                 (P2)
                 /*base_flow--;*/
                 old_flow=current_flow;
                 count=0;
       }
       else
       {
              base_flow=base_flow-old_flow+current_flow;
              old_flow=current_flow;
              count++;
       }
    }
}
else
    base_flow=current_flow;
if(slope==DOWN)
{
    if (base_flow>current_flow)
       {
            return base_flow;
       }
    else
       {
            charge_flow_filter=INACTIVE;
            discharge_flow_filter=INACTIVE;
            time_counter=time_out_counter=0;
            slope=NONE;
            return(current_flow);
       }
}
else if (slope==UP)
    }
    if (base_flow<current_flow)
       {
            return base_flow;
       }
       else
       {
            charge_flow_filter=INACTIVE;
            discharge_flow-filter=INACTIVE;
            time_counter=time_out_counter=0;
            slope=NONE;
            return(current_flow);
       }
    }
    else
       return base_flow;
}
```

The program receives an integer variable, current_flow which represents the instantaneous value of flow to the fluid pressure communication conduit. The filtered output value is the value of the function of this program. It is an integer and is referred to as slay_dragon. To facilitate referencing parts of the program, page number references P1, P2 and P3 are provided at the lower right corners. These are not part of the program to be compiled. Quantities in the subroutine designated static are kept in memory between repeated executions of the subroutine, so the subroutine functions as if it were continuously running.

The subroutine function slay-dragon, in addition to having current_flow as an input, also has Boolean variables, charge_flow_filter, discharge flow_filter, and flow_filter_trans. These are received in the program as inputs. They have meanings as follows.

The variable charge_flow_filter is a logical signal indicating that a charging valve for increasing the pressure in the reservoir chamber which affects flow in the fluid pressure communication conduit is open.

The variable discharge_flow_filter is a logical signal indicating that a discharge valve for decreasing pressure in the chamber is open.

The variable flow_filter_trans indicates a transition in either direction between charge_flow_filter and discharge_flow_filter.

A person skilled in the art, and knowledgeable of the C language will note the following: When the subroutine is first called, if none of the three Boolean inputs indicating valve activity are true, the processing bypasses pages P1 and P2. The first executable instruction in that case is at line 13 on page P3, where the first processing mode is begun. On line 13, base_flow is set equal to current_flow. The following statements dependent on nonzero values for the variable slope are bypassed, and at line 45, the value of base_flow is returned as the value of the filtered flow, which is the value given to the subroutine slay-dragon.

As long as no signal indicating valve activity is received, the process above is repeated every time the subroutine is called. if, however, a TRUE value is received for either charge_flow_filter or discharge_flow_filter, then processing begins following line 22 on page P1. In the code between lines 24 and 31, a test is made to see whether the maximum time for filtering, which is DRAGON_TIME has been exceeded. DRAGON_TIME has a value in the program (as defined) of 458. The real time corresponding this is 458 * 70 milliseconds which is 32060 milliseconds, which is about 32 seconds. If this time is exceeded, then the lines up to 30 reinitialize variables involved in the filtering and return the value of current_flow as the value of slay_dragon.

If time has not been exceeded, and the time counter indicates that time is 0, then base_flow is set equal to the current_flow in line 35, and this value is returned as the value of slay_dragon. If time is greater than zero, but less than 9, then the system is in the first filtering interval denoted 120 in FIG. 2. During this time interval, the base flow is kept unchanged and it is returned as the value of slay_dragon. When time counter reaches 9, the elapsed time since the beginning of the first filtering interval is 9 * 70 milliseconds, which is 630 milliseconds. This is the first predetermined time designated 104 in FIG. 2.

The comment statements at the top of page P2 tell what happens next. DELTA is calculated, which is the absolute magnitude of the difference between base_flow and instant value of current_flow. SLOPE is +1 if current_flow is greater than base_flow, and it is -1 if base_flow is greater than current_flow.

In line 28 a test is made to see whether DELTA is large enough to require filtering. If it is less than 4, then the first filtering interval is terminated in line 28. If it is greater than 4, then in line 30 the ramp function is defined. The ramp function is provided by adding SLOPE, (which is 1 or -1) at times calculated in line 30. This produces the ramp of the second filtering interval shown as 100 in FIG. 2. Subsequent coding provides for terminating the second filtering interval if the instant value of current_flow becomes closer to base_flow than the ramp value.

If, on one of the entries into this subroutine, the input Boolean variable, flow_filter_trans is true, then starting at line 15 on page P1, the filtering process is set to reset, going back to time 102 in FIG. 2. It starts with the most recent ramp value as the value for base_flow.

Now, discussing the invention more broadly, there is disclosed a method and apparatus for providing a filtered signal which indicates a flow of fluid to a fluid pressure communication conduit. The fluid, for example, may be air, and the conduit may be a brakeline of a locomotive. The flow is dependent upon the pressure of fluid in a chamber, which may be air in the equalizing chamber of a locomotive. The pressure of fluid in the chamber is controlled by at least one pressure adjusting valve.

The invention provides for receiving into a data processing module at least one signal indicating an open pressure adjusting valve. The invention also provides for receiving into the data processing module a flow signal which indicates a value of a real instantaneous flowrate for the flow of fluid to the fluid pressure communication conduit.

The invention provides for choosing between a first processing mode and a second processing mode for the flow signal, the first processing mode during times when the second processing mode is not in effect, and when neither of the valve signals indicates an open valve. The second processing mode is activated when at least one of the valve signals indicates an open valve. The second processing mode, when activated, proceeds according to a predetermined procedure and then returns to the first processing mode after no valve signal indicates an open valve.

The invention provides for processing the signal by either the first processing mode or the second processing mode, as chosen above. It also provides the filtered signal as an output of the data processing module.

The chamber cited above may be a chamber for a pilot pressure which controls the flow rate through a flow control valve to maintain the pressure in the fluid pressure communication conduit at a predetermined value.

The first processing mode cited above may determine the output signal from an instantaneous value of the input flow signal. In fact, it may equal the input flow signal.

The second processing mode may include the following steps, performed within the data processing module.

At least one time counter indicating elapsed time may be started at the beginning of the second processing mode. At that time, a base flow value may be determined based on an instantaneous value of the flow signal. During a first filtering interval of the second processing mode, the first filtering interval terminating at a first predetermined time, the output signal may be given a value corresponding to the base flow value. At the first predetermined time, the required flowrate change may be determined from an instantaneous value of the flow signal, in comparison to the base flow value.

The system may determine a generally monotonic function to transition between the base flow and the base flow changed by the required flowrate change, and may begin a second filtering interval wherein the output signal receives a value equal to the generally monotonic function. The generally monotonic function may, for example, be a ramp function which provides for the required flowrate change at a second predetermined time.

The ramp function may be generated by determining an increment for the height of the ramp, and a number of timesteps to count between increments, the increments all being the same size. It is preferred that the size of the increments be either +1 or -1.

In the event that the instantaneous value of the flow indicated by the flow signal becomes closer to the base flow value than the value of the monotonic function, the second filtering interval may be terminated and control returned to the first processing mode. The second filtering interval may be terminated at the second predetermined time if it is not terminated earlier.

The invention also provides for the case in which there are two pressure adjusting valves, one for charging the chamber and one for discharging the chamber. For example, the equalizing chamber in a locomotive has both a charge valve and a discharge valve.

The invention provides for a case in which either the charge valve or the discharge valve has opened, beginning the filtering process, and then the other valve is opened. The invention responds by terminating the extant filtering process, and returning to the beginning of a new first filtering interval, shown as 120 in FIG. 2, and setting base_flow equal to the output value at the time that a signal was received indicting that the second valve had been opened.

The pressure adjustment valves may be electrically actuated, and the signals indicating an open valve condition may be directly derived from the electrical signals supplied to the valves. While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A method of providing a filtered signal indicative of a flow of fluid to a fluid pressure communication conduit, said flow dependent upon a pressure of fluid in a chamber, said pressure of fluid in said chamber controlled by at least one pressure adjusting valve, said method comprising:
   (a) receiving into a data processing module at least one first signal indicative of an open state for at least one of said at least one pressure adjustment valve;
   (b) receiving into said data processing module a second signal indicative of a value of a real instantaneous flowrate for said flow of fluid to said fluid pressure communication conduit;
   (c) choosing between a first processing mode and a second processing mode for said second signal, said first processing mode during times when said second processing mode is not in effect, and when said at least one first signal does not indicate an open valve, said second processing mode activated when at least one of said at least one first signal indicates an open valve, said second processing mode, when activated, proceeding according to a predetermined procedure and then returning to said first processing mode when said at least one first signal indicates an open valve;
   (d) said data processing module processing said second signal by said first processing mode and said second processing mode, as chosen in step (c), and providing said filtered signal indicative of said flow of said fluid as an output signal to equipment external to said data processing module.

2. A method according to claim 1 wherein said chamber is a chamber for a pilot pressure which controls flow rate through a flow control valve to maintain a pressure in said fluid pressure communication conduit at a predetermined value.

3. A method according to claim 1 wherein said first processing mode determines said output signal from an instantaneous value of said second signal.

4. A method according to claim 3 wherein said output signal determined in said first processing mode is identical to said second signal.

5. A method according to claim 1 wherein said second processing mode includes steps as follows, performed within said data processing module:
   (i) starting at least one time counter indicating elapsed time since a beginning of said second processing mode;
   (ii) determining a base flow value based on an instantaneous value of said second signal when said second processing mode is begun;
   (iii) during a first filtering interval of said second processing mode, said first filtering interval terminating at a first predetermined time, determining said output signal to have a value corresponding to said base flow value;
   (iv) at said first predetermined time, determining a required flowrate change from a current instantaneous value of said second signal;
   (v) determining a generally monotonic function to transition between said base flow value and said base flow value changed by said required flowrate change, and beginning a second filtering interval wherein said output signal receives a value equal to said generally monotonic function;
   (vi) terminating said second filtering interval if an instantaneous value of flow corresponding to said second signal becomes closer to said base flow value than said generally monotonic function; and
   (vii) terminating said second filtering interval at a second predetermined time if not terminated in step (vi).

6. A method according to claim 5 wherein said generally monotonic function is a ramp function having a height equal to said required flowrate change.

7. A method according to claim 6 wherein said data processing module generates said ramp function by determining a number of timesteps between increments of said ramp function, said increments having a predetermined value, and incrementing said ramp function accordingly.

8. A method according to claim 7 wherein said predetermined value of said increments has a magnitude of unity.

9. A method according to claim 5 wherein said generally monotonic function has a predetermined duration terminating at said second predetermined time.

10. A method according to claim 5 wherein said at least one pressure adjusting valve includes a pressure increasing valve for increasing pressure in said chamber, an open condition of said pressure increasing valve signalled by a pressure increasing first signal and wherein said at least one pressure adjusting valve further includes a pressure decreasing valve for decreasing pressure in said chamber, an open condition of said pressure decreasing valve signalled by a pressure decreasing first signal, said method providing for a case in which said pressure increasing first signal has been received in said data processing module, placing it in said second processing mode, whereupon said pressure decreasing first signal is received in said data processing module, said method responding to this condition by interrupting said second processing mode, resetting said at least one time counter and returning to a second beginning of said second processing mode, an output signal during said first filtering interval of said second processing mode being set equal to an output signal prior to said second beginning.

11. A method according to claim 5 wherein said at least one pressure adjusting valve includes a pressure increasing valve for increasing pressure in said chamber, an open condition of said pressure increasing valve signalled by a pressure increasing first signal and wherein said at least one pressure adjusting valve further includes a pressure decreasing valve for decreasing pressure in said chamber, an open condition of said pressure decreasing valve signalled by a pressure decreasing first signal, said method providing for a case in which said pressure decreasing first signal has been received in said data processing module, placing it in said second processing mode, whereupon said pressure increasing first signal is received in said data processing module, said method responding to this condition by interrupting said second processing mode, resetting said at least one time counter and returning to a second beginning of said second processing mode, an output signal during said first filtering interval of said second processing mode being set equal to an output signal prior to said second beginning.

12. A method according to claim 1 wherein said at least one pressure adjustment valve is activated by at least one electrical valve actuation signal, said method further including the process of obtaining said at least one first signal from said at least one electrical valve actuation signal.

13. An apparatus for providing a filtered signal indicative of a flow of fluid to a fluid pressure communication conduit, such flow dependent upon a pressure of fluid in a chamber, such pressure of fluid in such chamber controlled by at least one pressure adjusting valve, said apparatus comprising:

(a) a data processing module connected to receive at least one first signal indicative of an open state for at least one of such at least one pressure adjustment valve, said data processing module further connected to receive a second signal from a flowmeter, such second signal indicative of such flow of fluid to such fluid pressure communication conduit;

(b) means disposed in said data processing module for choosing between a first processing mode and a second processing mode for such second signal, said first processing mode during times when said second processing mode is not in effect, and when such at least one first signal does not indicate an open valve, said second processing mode activated when such at least one first signal indicates an open valve, said second processing mode, when activated, proceeding according to a predetermined procedure and then returning to such first processing mode when such at least one first signal indicates an open valve;

(c) said data processing module processing such second signal by said first processing mode and said second processing mode, as chosen in step (b), and providing said filtered signal indicative of such flow of such fluid as an output signal to equipment external to said data processing module.

14. An apparatus according to claim 13 wherein such chamber is a chamber for a pilot pressure which controls flow rate through a flow control valve to maintain a pressure in such fluid pressure communication conduit at a predetermined value.

15. An apparatus according to claim 13 wherein said first processing mode determines said output signal from an instantaneous value of such second signal.

16. An apparatus according to claim 15 wherein said output signal determined in said first processing mode is identical to such second signal.

17. An apparatus according to claim 13 wherein said data processing module further includes:

(i) at least one time counter and means for starting said at least one time counter at a beginning of said second data processing mode;

(ii) means for determining a base flow value based on an instantaneous value of such second signal when said second processing mode is begun;

(iii) means for determining said output signal from said base flow value during a first filtering interval, said first filtering interval terminating at a first predetermined time;

(iv) means for determining a required flowrate change from said base flow value to a flow value based on an instantaneous value of such second signal at said first predetermined time;

(v) means for determining a generally monotonic function to transition between said base flow value and said base flow value changed by said required flowrate change, and for beginning a second filtering interval wherein said output signal receives a value equal to said generally monotonic function;

(vi) means for terminating said second filtering interval if an instantaneous value of flow corresponding to such second signal becomes closer to said base flow value than said generally monotonic function; and (vii) means for terminating said second filtering interval at a second predetermined time if not terminated in step (vi).

18. An apparatus according to claim 17 wherein said generally monotonic function is a ramp function having a height equal to said required flowrate change.

19. An apparatus according to claim 18 wherein said data processing module generates said ramp function by determining a number of timesteps between increments of said ramp function, said increments having a predetermined value, and incrementing said ramp function by successive additions.

20. An apparatus according to claim 19 wherein said predetermined value of said increments has a magnitude of unity.

21. An apparatus according to claim 17 wherein said generally monotonic function has a predetermined duration terminating at said second predetermined time.

22. An apparatus according to claim 17 wherein such at least one pressure adjusting valve includes a pressure increasing valve for increasing pressure in such chamber, an open condition of such pressure increasing valve signalled by a pressure increasing first signal and wherein such at least one pressure adjusting valve further includes a pressure decreasing valve for decreasing pressure in such chamber, an open condition of such pressure decreasing valve signalled by a pressure decreasing first signal, said apparatus providing for a case in which such pressure increasing first signal has been received in said data processing module, placing it in said second processing mode, whereupon such pressure decreasing first signal is received in said data processing module, said apparatus responding to this condition by interrupting said second processing mode, resetting said at least one time counter and returning to a second beginning of said second processing mode, an output signal during said first filtering interval of said second processing mode being set equal to an output signal prior to said second beginning.

23. An apparatus according to claim 17 wherein such at least one pressure adjusting valve includes a pressure increasing valve for increasing pressure in such chamber, an open condition of such pressure increasing valve signalled by a pressure increasing first signal and wherein such at least one pressure adjusting valve further includes a pressure decreasing valve for decreasing pressure in such chamber, an open condition of such pressure decreasing valve signalled by a pressure decreasing first signal, said apparatus providing for a case in which such pressure decreasing first signal has been received in said data processing module, placing it in a second processing mode, whereupon such pressure increasing first signal is received in said data processing module, said apparatus responding to this condition by interrupting said second processing mode, resetting said at least one time counter and returning to a second beginning of said second processing mode, an output signal during said first filtering interval of said second processing mode being set equal to an output signal prior to said second beginning.

24. An apparatus according to claim 13 wherein such at least one pressure adjustment valve is activated by at least one electrical valve actuation signal, said apparatus further including means connected to such electrical valve actuation signal for obtaining such at least one first signal from such at least one electrical valve actuation signal.

25. An apparatus for providing an output signal indicative of a filtered value of airflow to a brakepipe of a locomotive, a pneumatic valve determining such airflow causing a pressure of such brakepipe to follow a pressure in an equalizing chamber, such equalizing chamber having pressure adjusted upward by an electrically activated charge valve and adjusted downward by an electrically activated discharge valve, said apparatus comprising:

(a) a data processing module connected to receive a charge valve signal indicative of an open condition for such charge valve, said data processing module further connected to receive a discharge valve signal indicative of an open condition for such discharge valve, said data processing module further connected to receive a flow rate signal from a flow sensor in a supply path to such brakepipe, such flow sensor in series with such pneumatic valve;

(b) means disposed in said data processing module for choosing between a first processing mode and a second processing mode for such flowrate signal, said first processing mode during times when said second processing mode is not in effect and when neither of such charge signal nor such discharge signal is present, such first processing mode determining said output signal directly from an instantaneous value of such flowrate signal, said first processing mode terminating and said second processing mode beginning on receipt of at least one of such charge signal and such discharge signal;

(c) means disposed in said data processing module for implementing said second processing mode, said means including:

(i) at least one time counter and means for starting said at least one time counter when said second processing mode is started;

(ii) means for determining a base flow value based on a first instantaneous value of such flowrate signal when said second processing mode has begun;

(iii) means for setting said output signal equal to a value of said base flow value during a first filtering interval terminating at a first predetermined time, as indicated by at least one of said at least one time counter;

(iv) means for determining a required change in output signal from said base flow value to a second instantaneous flow value from such flowrate signal, said second instantaneous value prevailing at said first predetermined time;

(v) means for transitioning said output signal from said base flow value to said second instantaneous value base flow value during a second filtering interval terminating at a second predetermined time;

(vi) means for terminating said second filtering interval and returning to said first processing mode at said second predetermined time; and (vii) means for terminating said second filtering interval prior to said second predetermined time if such flowrate signal becomes closer to said base flow value than said output signal.

26. An apparatus according to claim 25 further characterized as connected to receive a transition signal indicative of a transition from such charge valve signal to such discharge valve signal, said apparatus having means for terminating said second filtering interval prior to said second predetermined time if such transition signal is received in said data processing module, said apparatus also having means activated by such transition signal for resetting said at least one time counter and repeating said first filtering interval and said second filtering interval, determining said base flow value from a value of said output signal prevailing when such transition signal was received.

27. An apparatus according to claim 25 further characterized as connected to receive a transition signal indicative of a transition from such discharge valve signal to such charge valve signal, said apparatus having means for terminating said second filtering interval prior to said second predetermined time if such transition signal is received in said data processing module, said apparatus also having means activated by such transition signal for resetting said at least one time counter and repeating said first filtering interval and said second filtering interval, determining said base flow value from a value of said output signal prevailing when such transition signal was received.

\* \* \* \* \*